United States Patent
Andruskiewicz, IV et al.

(10) Patent No.: US 11,319,894 B2
(45) Date of Patent: May 3, 2022

(54) INSULATED EXHAUST PORT LINER FOR A CYLINDER HEAD ASSEMBLY OF A MOTOR VEHICLE

(71) Applicant: GM Global Technology Operations LLC, Detroit, MI (US)

(72) Inventors: Peter P. Andruskiewicz, IV, Ann Arbor, MI (US); Russell P. Durrett, Bloomfield Hills, MI (US); Michael A. Potter, Grass Lake, MI (US); Paul M. Najt, Bloomfield Hills, MI (US); Tobias A. Schaedler, Oak Park, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 16/888,511

(22) Filed: May 29, 2020

(65) Prior Publication Data

US 2021/0372345 A1 Dec. 2, 2021

(51) Int. Cl.
*F02F 1/42* (2006.01)
*F02F 11/00* (2006.01)
*B22D 19/00* (2006.01)
*B28B 23/02* (2006.01)
*B05D 3/02* (2006.01)
*B05D 1/12* (2006.01)

(52) U.S. Cl.
CPC .............. *F02F 1/4271* (2013.01); *B05D 1/12* (2013.01); *B05D 3/0254* (2013.01); *B22D 19/0009* (2013.01); *B28B 23/02* (2013.01); *F02F 11/002* (2013.01)

(58) Field of Classification Search
CPC ......... F02F 1/4271; F02F 11/002; B05D 1/12; B05D 3/0254; B22D 19/0009; B28B 23/02; C04B 2/00; C23C 4/00
See application file for complete search history.

(56) References Cited

U.S. PATENT DOCUMENTS

| | | | |
|---|---|---|---|
| 4,096,690 A | 6/1978 | Florek | |
| 4,195,477 A | 4/1980 | Yamazaki et al. | |
| 5,150,572 A | 9/1992 | Johnson et al. | |
| 5,550,338 A * | 8/1996 | Hielscher | B32B 3/10 181/290 |
| 5,582,784 A * | 12/1996 | Daws | B28B 1/50 264/44 |
| 6,213,090 B1 | 4/2001 | Tamai et al. | |
| 2002/0097760 A1* | 7/2002 | May | G01J 3/28 372/18 |
| 2007/0022982 A1 | 2/2007 | Genise et al. | |

(Continued)

*Primary Examiner* — Jacob M Amick
*Assistant Examiner* — Charles J Brauch
(74) *Attorney, Agent, or Firm* — Vivacqua Crane PLLC

(57) ABSTRACT

An insulated exhaust port liner of a cylinder head assembly for fluidly connecting to an internal combustion engine of a motor vehicle includes a sealing layer. The sealing layer has a first surface defining a passage for fluidly connecting to the internal combustion engine and receiving exhaust gas. The sealing layer further includes a second surface opposite to the first surface. The liner further includes a thermal barrier layer coated onto the second surface of the sealing layer. The thermal barrier layer is a porous non-woven material for supporting the sealing layer on the cylinder head and reducing a transfer of heat from the sealing layer to the cylinder head.

19 Claims, 7 Drawing Sheets

(56) References Cited

U.S. PATENT DOCUMENTS

2016/0185935 A1\* 6/2016 Crooks ................ C04B 41/009
                                                          428/212
2019/0376465 A1\* 12/2019 Bilancia ............. B22D 19/0009
2020/0063690 A1\* 2/2020 Coppola ............... B29C 70/222

\* cited by examiner

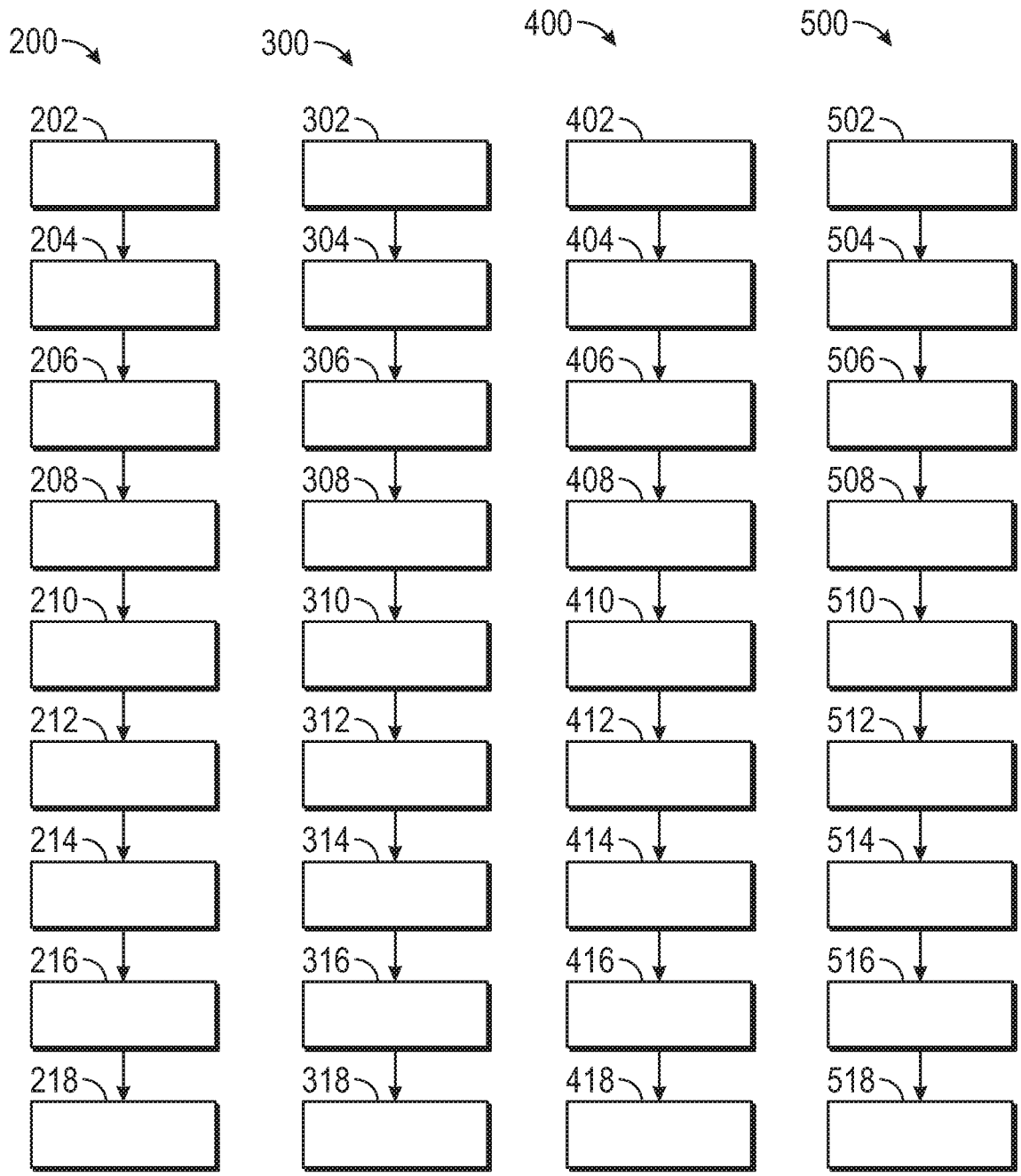

INSULATED EXHAUST PORT LINER FOR A CYLINDER HEAD ASSEMBLY OF A MOTOR VEHICLE

GOVERNMENT LICENSE RIGHTS

This invention was made with government support under contract No. DE-EE0007754 awarded by the U.S. Department of Energy. The government has certain rights in the invention.

INTRODUCTION

The present disclosure relates to cylinder heads of internal combustion engines for motor vehicles, and more particularly, to an insulated exhaust port liner of a cylinder head assembly for reducing heat losses from exhaust gases, expediting catalyst warm-up, decreasing engine cooling demands, and increasing potential for exhaust gas recovery.

Insulated engine exhaust ports reduce the loss of heat from the engine exhaust gases to improve the performance of emission control equipment, such as catalytic converters or thermal reactors. Liners in the exhaust ports have been developed for reducing heat loss through the engine exhaust port walls. One example of an exhaust port liner includes a spray-on coating into the exhaust port of a cast cylinder head. Because the spray application is a line-of-sight process, it can be somewhat cumbersome to deposit the coating onto all surfaces within the exhaust port, and improper spray application can cause the coating to later have adhesion failure and flake. Another example of an exhaust port liner includes inner and outer tubular metal shells spaced from one another and having an air gap between the same. A metal cylinder head is cast around the outer shell while a removable insert is positioned within the inner shell adjacent to the outlet port. After casting of the metal cylinder head, the insert is removed and replaced by a gasket member. Because of the air gap between the inner and outer shells, the inner shell may be under-supported and the liner may fail.

Thus, while exhaust port liners may partially achieve their intended purpose, there is a need for a new and improved exhaust port liner that addresses these issues.

SUMMARY

According to several aspects, an insulated exhaust port liner of a cylinder head assembly for fluidly connecting to an internal combustion engine of a motor vehicle is provided. The insulated exhaust port liner includes a sealing layer is a conduit having a first surface defining a passage for fluidly connecting to the internal combustion engine and receiving exhaust gas. The sealing layer further includes a second surface opposite to the first surface. The liner further includes a thermal barrier layer coated onto the second surface of the sealing layer. The thermal barrier layer is a porous non-woven material for supporting the sealing layer on the cylinder head and reducing a transfer of heat from the sealing layer to the cylinder head.

In one aspect, the thermal barrier layer formed by adhering a plurality of hollow microspheres to a mold with a binder and sintering the thermal barrier layer, with the hollow microspheres being made of metal or ceramic.

In another aspect, the thermal barrier layer further includes a protective layer coupled to a side of the thermal barrier layer opposite to the sealing layer.

In another aspect, the thermal barrier layer includes a foam layer formed by mixing a liquid ceramic and a foaming agent.

In another aspect, the thermal barrier layer includes a ceramic foam formed by impregnating an open-cell polymer foam with a ceramic slurry and firing the impregnated foam in a kiln or oven.

In another aspect, the thermal barrier layer includes an inwardly facing surface attached to the second surface of the sealing layer, an outwardly facing surface, and a wall thickness between the inwardly facing surface and the outwardly facing surface, and the sealing layer includes at least one flange extending through the wall thickness of the thermal barrier layer for positioning the exhaust port liner a mold to have a sand-core blown into it, and joining individual pieces of a multi-piece inner sealing surface.

According to several aspects, a cylinder head assembly for an internal combustion engine of a motor vehicle includes an insulated exhaust port liner. The liner includes a sealing layer in the form of a conduit having a first surface defining a passage for fluidly connecting to the internal combustion engine and receiving exhaust gas. The sealing layer further has a second surface opposite to the first surface. The liner further includes a thermal barrier layer formed on the second surface of the sealing layer, with the thermal barrier layer being formed from a porous non-woven material. The cylinder head assembly further includes a cylinder head cast around the insulated exhaust port liner.

In one aspect, the thermal barrier layer formed by adhering a plurality of hollow microspheres to a mold with a binder and sintering the thermal barrier layer, with the hollow microspheres being made of metal or ceramic.

In another aspect, the thermal barrier layer further includes a protective layer coupled to a side of the thermal barrier layer opposite to the sealing layer.

In another aspect, the thermal barrier layer includes a foam layer formed by mixing a liquid ceramic and a foaming agent.

In another aspect, the thermal barrier layer includes a ceramic foam formed by impregnating an open-cell polymer foam with a ceramic slurry and firing the impregnated foam in a kiln or oven.

In another aspect, the thermal barrier layer includes an inwardly facing surface attached to the second surface of the sealing layer, an outwardly facing surface, and a wall thickness between the inwardly facing surface and the outwardly facing surface, and the sealing layer includes one or more flanges extending through the wall thickness of the thermal barrier layer and directly engaging the cylinder head for positioning the insulated exhaust port liner in the cylinder head.

According to several aspects, a method of manufacturing a cylinder head assembly having a cylinder head and an exhaust port liner for an internal combustion engine of a motor vehicle is provided. A sealing layer is a conduit formed with a first surface that defines a passage for fluidly connecting to the internal combustion engine and receiving exhaust gas. The sealing layer further includes a second surface opposite to the first surface, and a thermal barrier layer is coated onto the second surface of the sealing layer, with the thermal barrier layer being formed from a porous non-woven material. The method further includes casting the cylinder head around the insulated exhaust port liner.

In one aspect, a press machine stamps a pair of components of the sealing layer. The pair of components are attached to one another to form the liner with each component having a first surface defining a passage, a second surface opposite to the first surface, and one or more flanges extending from the second surface. The flanges are used for positioning the liner in a mold.

In another aspect, a bonding material or a crimping device is used to attach the pair of sealing layer components to one another.

In another aspect, a portion of a mold cavity surrounding the sealing layer components is filled with a slurry to form the thermal barrier layer on the second surface of the sealing layer, and the slurry includes ceramic or a plurality of microspheres. The method further includes firing the mold.

In another aspect, a mixture of a binder and a plurality of microspheres is sprayed onto the second surface of the sealing layer to form a thermal barrier layer, and the sealing layer and the microspheres are sintered together. A protective layer is formed on the thermal barrier layer and fired.

In another aspect, a sand core insert is placed into the liner, and the cylinder head is cast around the liner, such that flanges of the sealing layer directly contact the cylinder head.

In another aspect, an injection molding process is used to form the thermal barrier layer around the sealing layer by injecting a foam layer around the sealing layer and firing foam layer in a kiln or oven, with the foam layer including a mixture of a liquid ceramic and a foaming agent.

In another aspect, an injection molding process is used to form the thermal barrier layer around the sealing layer by impregnating an open-cell polymer foam with a ceramic slurry and firing the impregnated foam in a kiln or oven.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 9 is a flow chart for one example of a method for manufacturing the insulated exhaust port liner of FIG. 4.

FIG. 10 is a flow chart for another example of a method for manufacturing the insulated exhaust port liner of FIG. 4.

FIG. 11 is a flow chart for yet another example of a method for manufacturing the insulated exhaust port liner of FIG. 4.

FIG. 12 is a flow chart for still another example of a method for manufacturing the insulated exhaust port liner of FIG. 4.

DETAILED DESCRIPTION

The following description is merely exemplary in nature and is not intended to limit the present disclosure, application, or uses.

Figure 1:
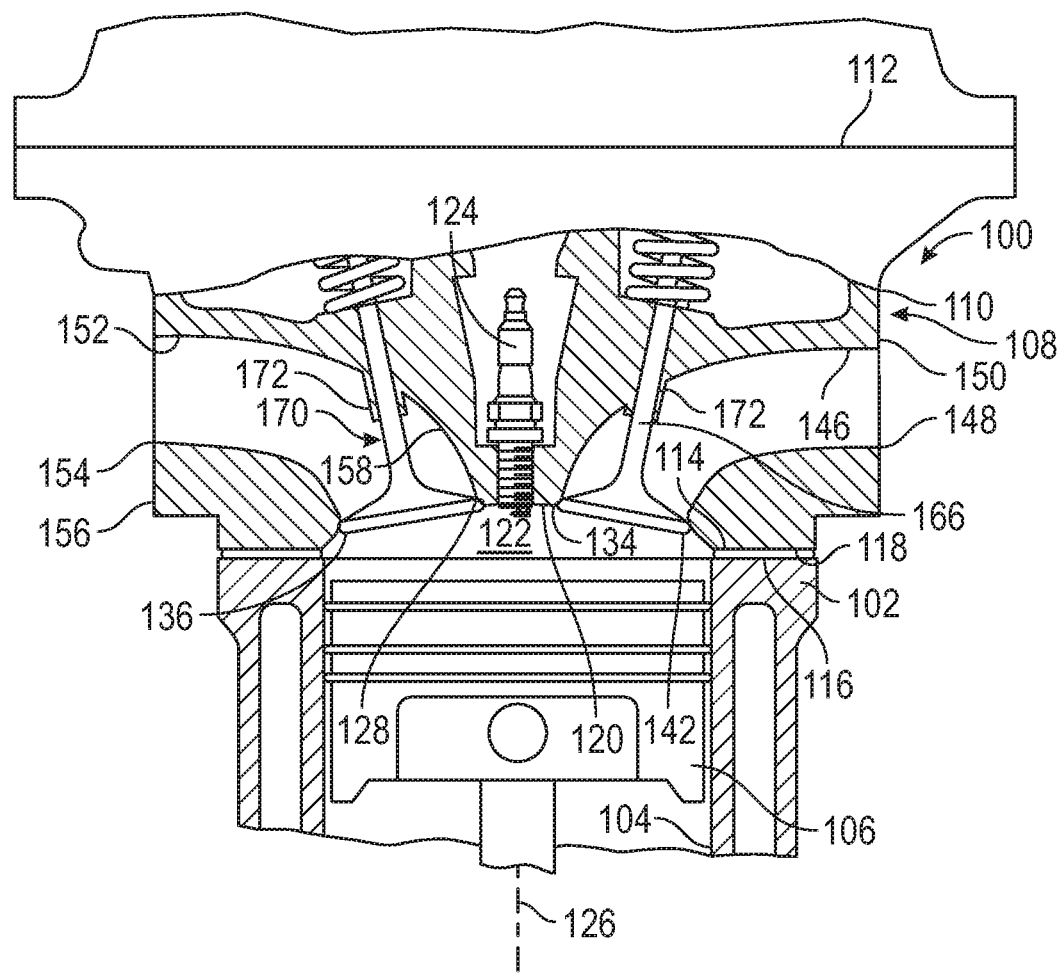
FIG. 1 is an enlarged cross-sectional view of a portion of one exemplary internal combustion engine for a motor vehicle, illustrating the engine having a cylinder head assembly that includes an insulated exhaust port liner fluidly connected to the engine.

Referring to FIG. 1, a portion of an internal combustion engine 100 for a motor vehicle is generally shown. The engine 100 includes a cylinder block 102 having a plurality of cylinders 104, only one of which is shown. The engine 100 further includes a plurality of pistons 106, only one of which is shown, for reciprocating in an associated one of the cylinders 104.

The engine 100 further includes one example of a cylinder head assembly 108, including a cylinder head 110 having upper and lower surfaces 112, 114, mounted upon the cylinder block 102 where the lower surface 114 is seated upon an upper deck 116 of the cylinder block to close the cylinders 104 with a head gasket 118 therebetween. At each cylinder location, a combustion chamber recess 120 is formed in the cylinder head lower surface 114 which cooperates with the piston 106 to form the combustion chamber 122.

Figure 2:
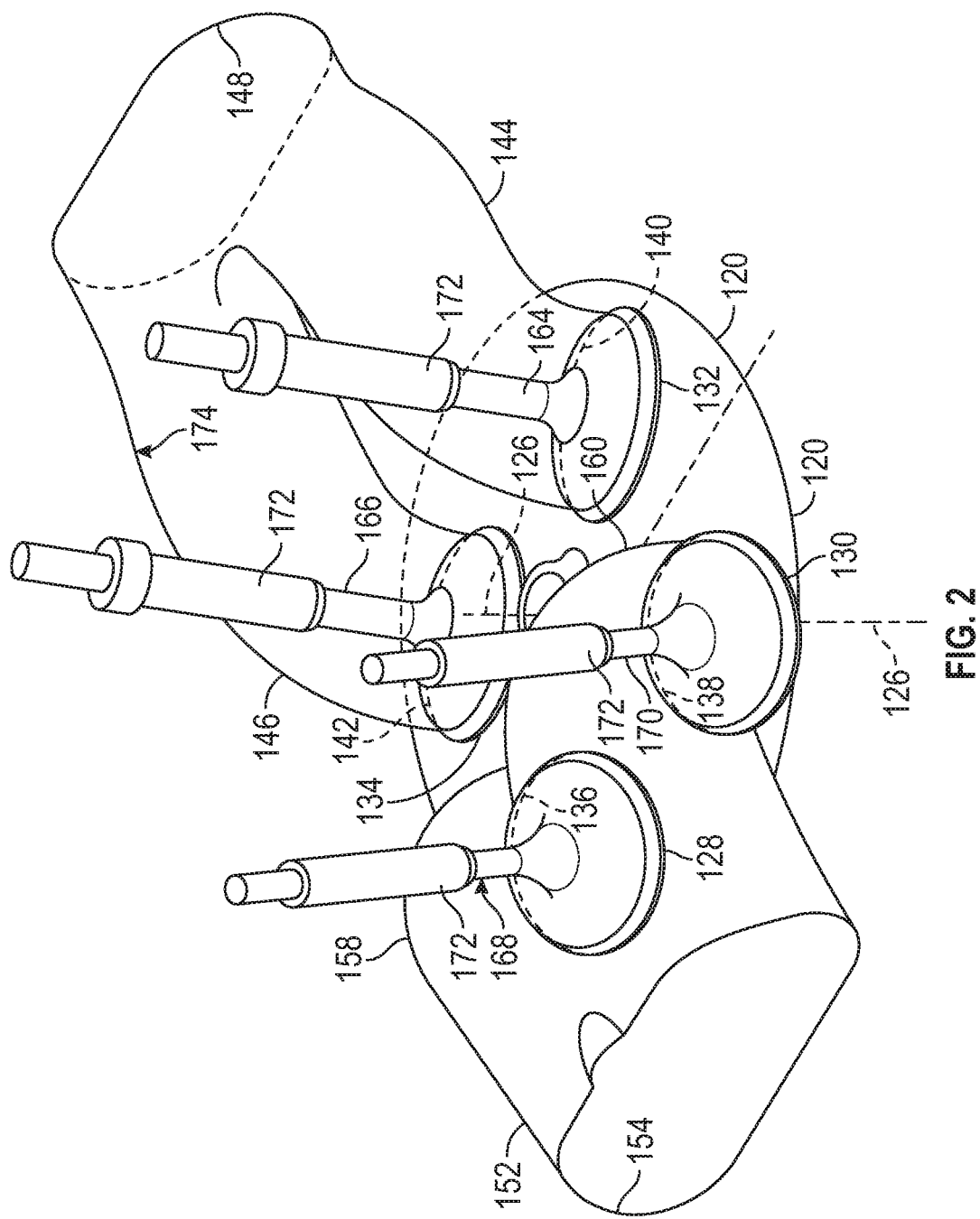
FIG. 2 is a perspective view of a portion of the cylinder head assembly of FIG. 1, illustrating the assembly including a cylinder head, an intake port liner, and an insulated port linter cast-in the cylinder head.
Figure 3:
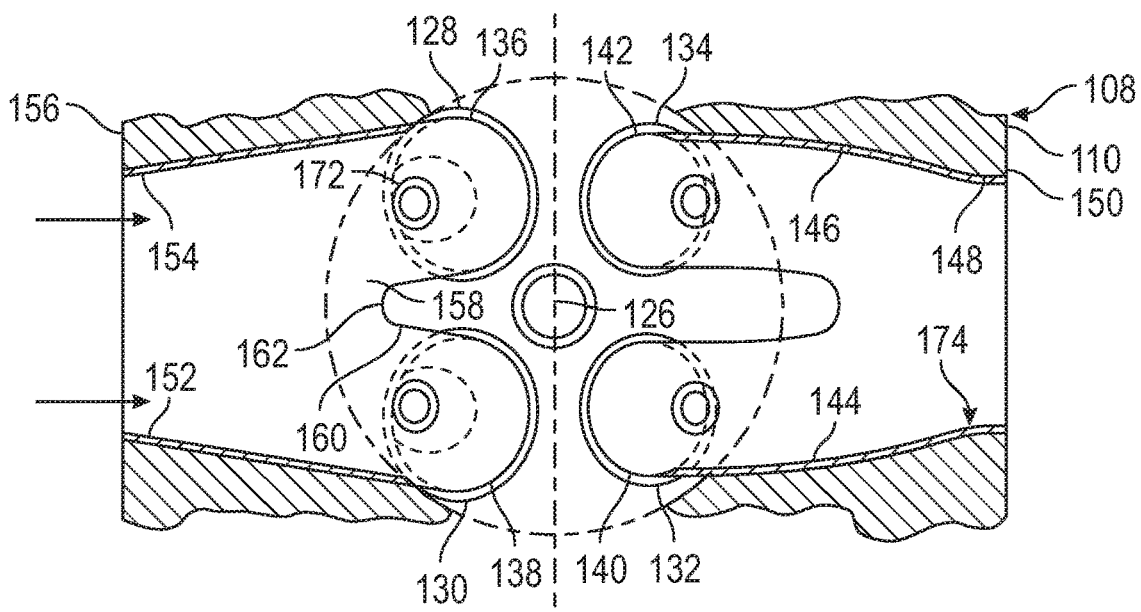
FIG. 3 is a bottom plan view of the intake port liner and the insulated exhaust port liner of FIG. 1.

Referring to FIGS. 2 and 3, this example of the engine 100 includes four valves per cylinder. In other examples, the engine can have more or fewer than four valves per cylinder. More specifically, the combustion chamber recess 120 of the cylinder head 110 defines four openings with valve seats about each one. The openings are referred to as a first intake opening 128, a second intake opening 130, a first exhaust opening 132, and a second exhaust opening 134, with respective valve seats including a first intake valve seat 136, a second intake valve seat 138, a first exhaust valve seat 140, and a second exhaust valve seat 142.

As best shown in FIG. 3, the cylinder head 110 further defines first and second exhaust port entrances 144, 146 having upstream ends fluidly connected to an associated one of the first and second exhaust openings 132, 134. The first and second exhaust port entrances 144, 146 further have a common downstream end fluidly connected to a common exhaust port outlet 148 through an exhaust side wall 150. It is contemplated that the cylinder head can include any number of exhaust ports per cylinder fluidly connected to common or dedicated openings or outlets. An exhaust manifold, not shown, is affixed to exhaust side wall 150.

The cylinder head 110 also includes an intake passage 152 having an upstream end fluidly connected to an intake inlet 154 formed in an intake side wall 156 of the cylinder head 110, with the intake outlet being fluidly connected to an intake manifold (not shown) for receiving intake air. The intake passage 152 further includes downstream ends fluidly connected to an associated one of first and second intake ports 158, 160. The first and second intake ports 158, 160 are divided by a septum 162 and extend along a curved flow path from the intake passage 152 to the associated first and second intake valve seats 136, 138. Intake air is delivered from the intake manifold to the combustion chamber 122 (FIG. 1) via the intake passage 152 and the intake ports 158, 160.

As shown in FIG. 3, first and second exhaust valves 164, 166 are coupled to an associated one of the first and second exhaust port entrances 144, 146, and the first and second intake valves 168, 170 are coupled to an associated one of the first and second intake port entrances 158, 160. Each valve 164, 166, 168, 170 is mounted for reciprocation in the cylinder head 110 by a valve guide 172. The intake valves 168, 170 operate to regulate flow of intake charge through the intake valve seats 136, 138 into the combustion chamber 122, and the exhaust valves 164, 166 operate to regulate exhaust gas flow out of the combustion chamber.

Figure 4:
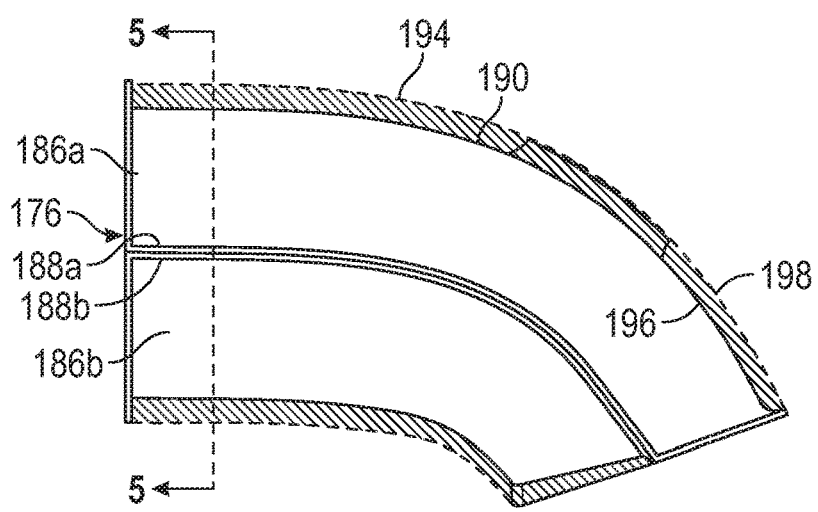
FIG. 4 is a side view of the insulated exhaust port liner of FIG. 1.
Figure 5:
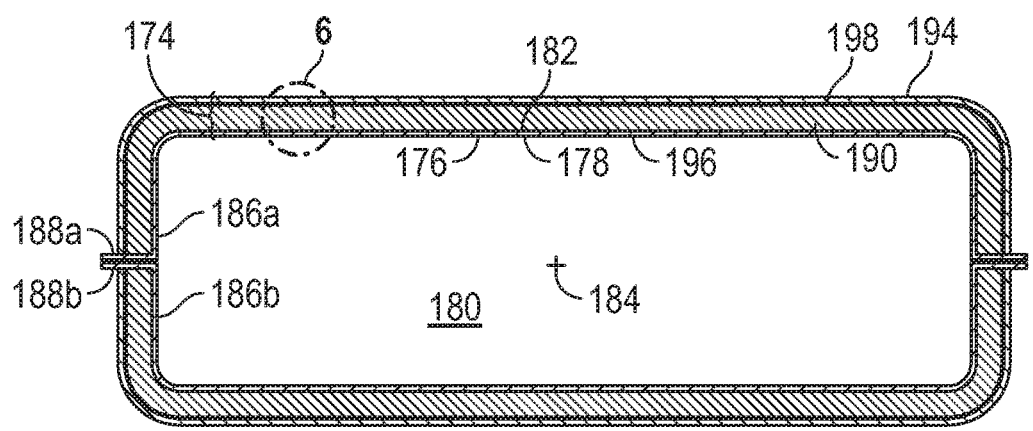
FIG. 5 is a cross-sectional view of the insulated exhaust port liner of FIG. 1 as taken along line 5-5, illustrating the liner including a sealing layer, a thermal barrier layer formed on the sealing layer, and a protective layer coated onto the thermal barrier layer.
Figure 6:
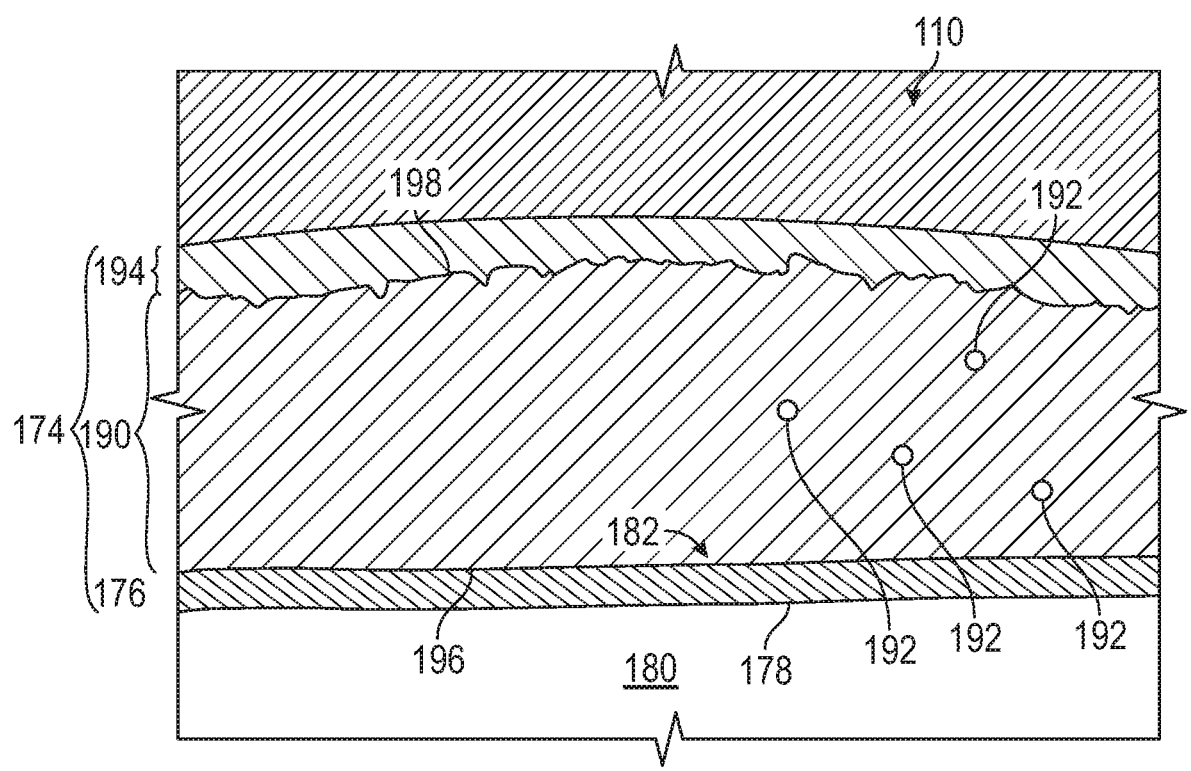
FIG. 6 is an enlarged cross-sectional view of the liner of FIG. 5 as encircled within circle 6, illustrating the cylinder head cast around the protective layer that is in turn coated onto the thermal barrier layer, such that the protective layer prevents the molten cylinder head metal from dissolving a metallic thermal barrier layer.
Figure 7:
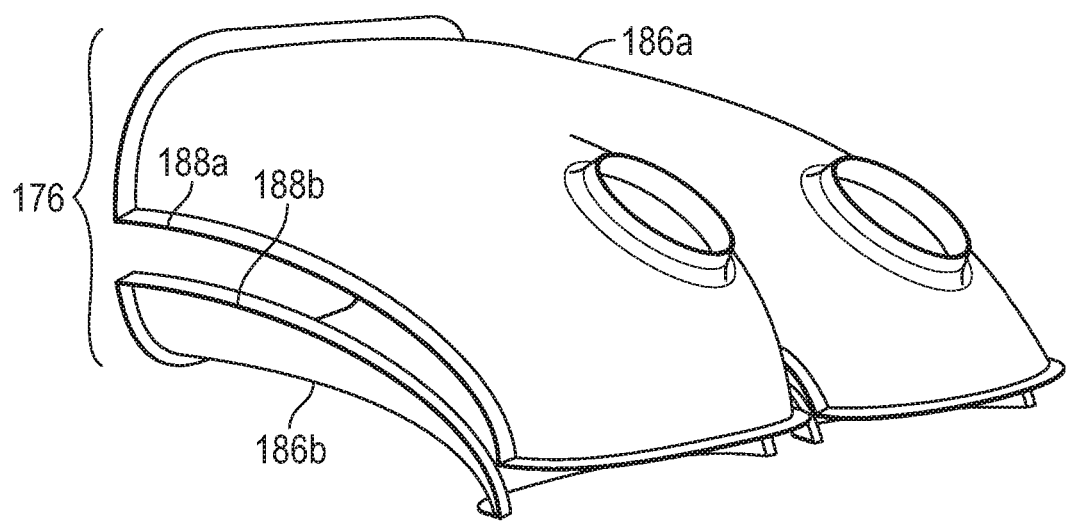
FIG. 7 is a perspective exploded view of the sealing layer of FIG. 5, illustrating two stamped components forming the sealing layer.
Figure 8A:
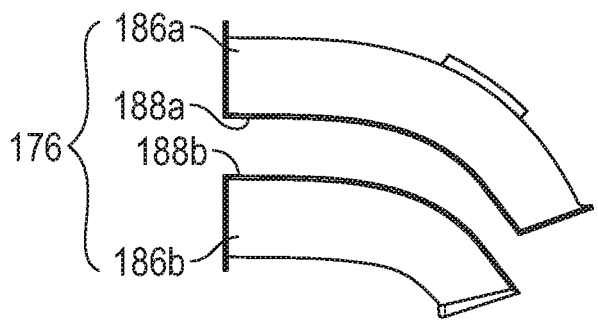
FIG. 8A is a side view of the sealing layer of FIG. 7, illustrating the step of forming the sealing layer by fastening the two stamped components to one another.

Referring to FIG. 3, the cylinder head assembly 108 further includes one example of an insulated exhaust port liner 174 ("liner") attached to the first and second exhaust port entrances 144, 146 for defining a passage 180 that fluidly connects to the cylinder of the engine. As best shown in FIGS. 4-6, the liner 174 includes a sealing layer 176 in the form of a conduit having a first surface 178 facing radially inward relative to the axis 184 for defining the passage 180 that receives exhaust gas. The sealing layer 176 further includes a second surface 182 opposite to the first surface 178 and facing radially outward relative to the axis 184. In this example, the sealing layer can have a wall thickness of 0.2 mm the first and second surfaces. However, it is contemplated that the sealing layer can have a wall thickness above or below 0.2 mm. Also, in this example, the sealing layer 176 includes two stamped components 186a, 186b (FIGS. 7 and 8A) having one or more associated flanges 188a, 188b for attaching the components to one another and forming the sealing layer 176. A bonding material such as copper or zinc can coat the adjoining flanges 188a, 188b for attaching the components 186a, 186b to one another. In another example, the flanges may be crimped, welded, or otherwise fastened to one another. In still another example, the sealing layer can be a single-piece hydroformed tube. It is contemplated that the sealing layer can have any number of components formed or assembled together by any suitable manufacturing process.

Referring again to FIGS. 4-6, the liner 174 further includes a thermal barrier layer 190 coated onto the second surface 182 of the sealing layer 176, with the thermal barrier layer 190 including a porous non-woven material for supporting the sealing layer 176 on the cylinder head 110 (FIG. 1) and reducing the amount of heat transferred from the sealing layer 176 to the cylinder head 110. In this example, the thermal barrier layer 190 is formed by using one or more flanges 188a, 188b to position the liner 174 in a liner mold 191 (FIGS. 8C and 8D), filling the liner mold 191 with a ceramic slurry or binder with microspheres 192 (FIG. 6) to form the thermal barrier layer 190 on the second surface 182 of the liner, and firing the liner mold 191. The hollow microspheres 192 can be made of metal or ceramic. In this example, the microspheres 192 are nickel. In another example, the microspheres are made of ceramic. In still another example, the thermal barrier layer can be made of ceramic foam. It is contemplated that the thermal barrier layer can include other suitable porous non-woven materials, as described in further detail below.

In this example, the liner 174 further includes a protective layer 194 coupled to a side of the thermal barrier layer 190 opposite to the sealing layer 176. The protective layer 194 can be formed on the thermal barrier layer 190 after it is removed from the liner mold. The protective layer 194 has a wall thickness in the range between 0.3 mm and 1.0 mm for preventing the metal microspheres from dissolving in molten metal when the cylinder head 110 is cast around the liner 174. In this example, the protective layer 194 is 0.5 mm thick and made of porous ceramic. In other examples, the protective layer may be made of steel, copper, nickel, iron, aluminum, zinc, tin, or other materials of any suitable thickness for protecting the thermal barrier layer from dissolving. It is contemplated that the liner may not include any layers coated onto the thermal barrier layer if protection from dissolution is not necessary.

Referring to FIG. 6, the thermal barrier layer 190 includes an inwardly facing surface 196 attached to the second surface 182 of the sealing layer 176, an outwardly facing surface 198, and a wall thickness between the inwardly facing surface 196 and the outwardly facing surface 198. In this example, the thermal barrier layer 190 can have a wall thickness of 1.0 mm between the inwardly and outwardly facing surfaces. However, it is contemplated the wall thickness of thermal barrier lawyer can be above or below 1.0 mm. The flanges 188a, 188b of the sealing layer 176 extend through the wall thickness of the thermal barrier layer 190, such that the flanges 188a, 188b support the liner 174 in a sand-core mold 195 (FIG. 8E) which forms a sand core 197 (FIGS. 8E and 8F). The sand core 197 extends from the openings of the liner, and the liner 174 and sand core 197 can be removed from the mold 195 and placed in the head casting pattern 199. The flanges 188a, 188b and the sand core 197 position the liner 174 in the casting pattern 199 (FIGS. 8G and 8H), such that the molten metal can be introduced into the casting pattern 199 for casting the cylinder head 110 around the liner 174. In addition, during operation of the engine, the flanges 188a, 188b provide a controlled path for transferring heat from the liner to the cylinder head 110 to prevent the bonding material from weakening and preventing the components 186a, 186b of the sealing layer 176 from separating from one another. In other examples where the sealing layer include components welded or crimped to one another, the sealing layer may not include the flanges.

It is contemplated that the thermal barrier layer 190 can include other suitable porous non-woven materials. In another example, the thermal barrier layer can be a foam layer formed by mixing a liquid ceramic and a foaming agent. In yet another example, the thermal barrier layer can be a ceramic foam formed by impregnating an open-cell polymer foam with a ceramic slurry and firing the impregnated foam in a kiln or oven.

Referring to FIG. 9, a flow chart of one example of a method 200 of manufacturing the cylinder head assembly of FIG. 1 is illustrated. The method commences at block 202 with the sealing layer 176 being formed. In this example, a press machine (not shown) is used to stamp the pair of components 186a, 186b.

At block 204, the sealing layer 176 is further formed by attaching the components 186a, 186b to one another (FIG. 8A), with the first surface 178 defining the passage 180, the second surface 182 opposite to the first surface 178, and one or more flanges 188a, 188b extending from the second surface 182. In this example, the bonding material can be used for attaching the flanges 188a, 188b of the associated components 186a, 186b to one another. In another examples, the flanges can be crimped to one another. It is contemplated that any suitable fastening method can be used for attaching the components to one another.

Figure 8B:
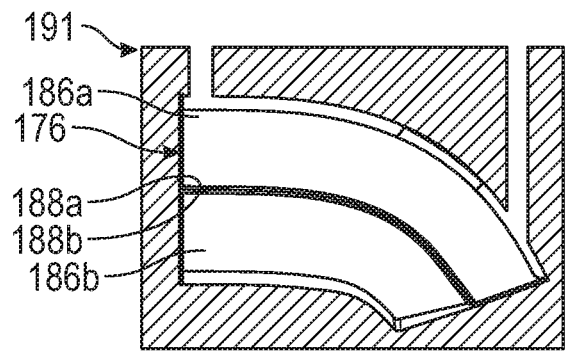
FIG. 8B is a side view of the sealing layer of FIG. 8A, illustrating the step of placing the sealing layer into a thermal barrier layer mold.
Figure 8C:
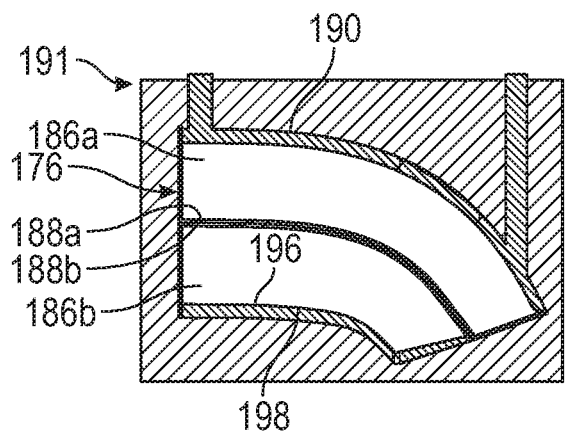
FIG. 8C is a side view of the sealing layer of FIG. 8B, illustrating the step of forming the thermal barrier layer on the sealing layer by injecting a molten material into the mold.
Figure 8D:
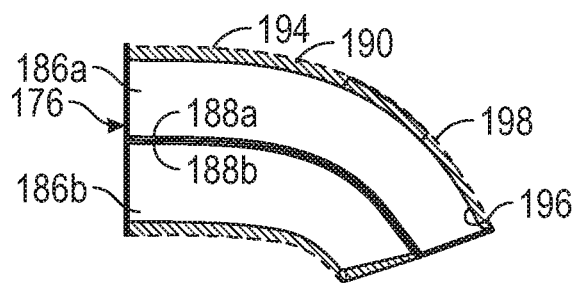
FIG. 8D is a side view of the sealing layer of FIG. 8C, illustrating the step of forming a protective layer on the thermal barrier layer to form the liner.
Figure 8E:
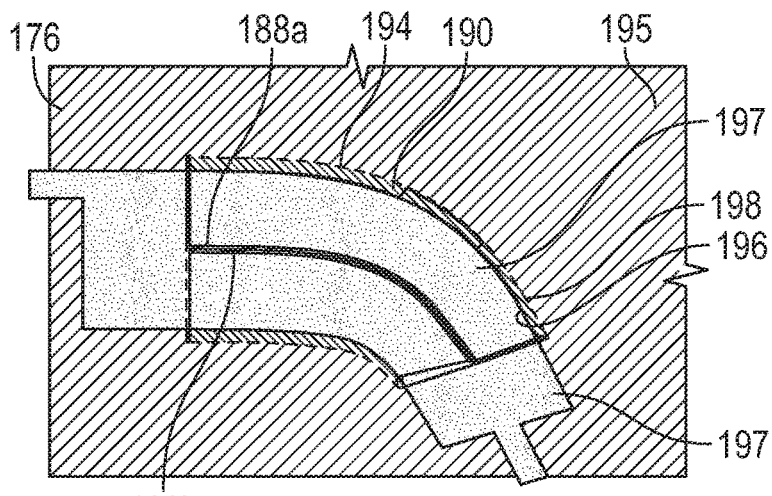
FIG. 8E is a side view of the liner of FIG. 8D, illustrating the step of using a sand core mold for blowing a sand core into a passage defined by the liner.
Figure 8F:
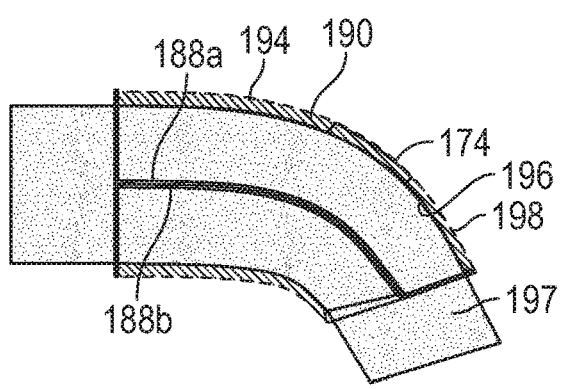
FIG. 8F is a side view of the liner of FIG. 8E, illustrating the step of removing the liner and the sand core from the sand core mold.

At block 206, the flanges 188a, 188b are used for positioning the sealing layer 176 in the liner mold 191 (FIG. 8B). In one example, the mold can have channels, seats, or other guide elements that engage the associated flanges 188a, 188b and positioning the sealing layer 176 in the liner mold 191.

At block 208, the thermal barrier layer 190 is coated onto the second surface 182 of the sealing layer 176 (FIG. 8C), with the thermal barrier layer 190 being made of a porous non-woven material. In this example, the liner mold 191 is filled with the slurry 193 (FIG. 8C) to form the thermal barrier layer 190 on the second surface 182 of the sealing layer 176, with the slurry including at least ceramic or metallic microspheres 192 (FIG. 6). The liner mold 191 is fired in a kiln or oven to sinter the ceramic or microspheres together and to the second surface 182 of the sealing layer 176, and the liner 174 is removed from the liner mold 191. It is contemplated that other suitable processes can be used to form the thermal barrier layer 190 of porous non-woven material on the second surface of the sealing layer.

At block 210, the protective layer 194 is applied to a side of the thermal barrier layer 190 opposite to the sealing layer 176 (FIG. 8D), and the protective layer 194 is fired. In another example, the layer 194 can be made of other materials. In still another example, the thermal barrier layer can directly engage the cylinder head 110 with no other layers therebetween.

At block 212, the flanges 188a, 188b are used to position the liner 174 in the sand core mold 195, and the sand core 197 is formed within the interior of the liner 174 and also extends from the openings of the liner 174.

Figure 8G:
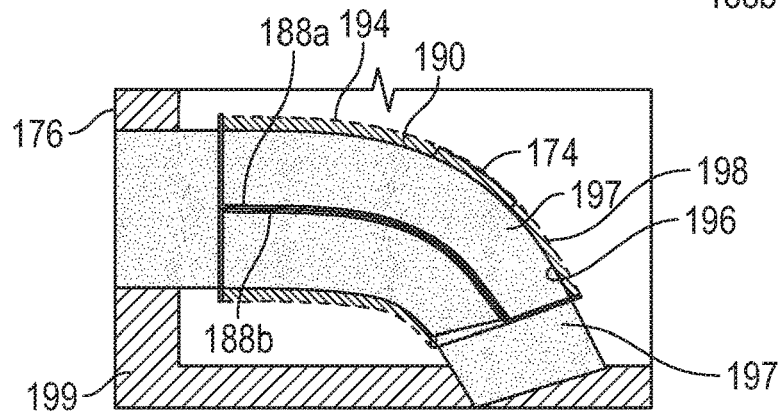
FIG. 8G is a side view of the liner of FIG. 8F, illustrating the step of placing the liner and the sand core into a cylinder head casting pattern and pouring molten metal into the pattern.
Figure 8H:
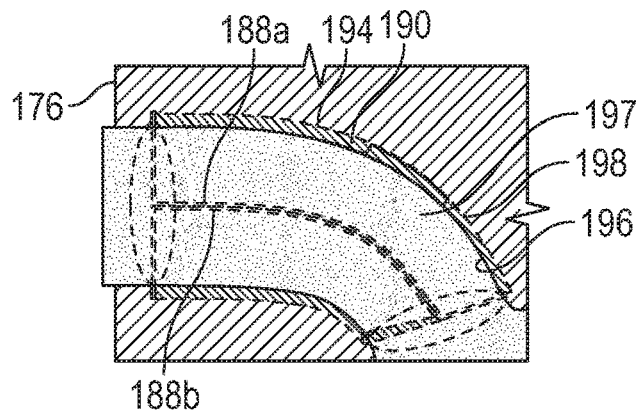
FIG. 8H is a side view of the liner of FIG. 8G, illustrating the step of casting the cylinder head around the liner.

At block 214, the combined sand core 197 and liner 174 (FIG. 8F) are removed from the sand core mold 195 and placed within the cylinder head casting pattern 199 or cast mold (FIG. 8G).

At block 216, molten metal is poured, injected, or forced into the head casting pattern 199 (FIG. 8H), where it cools around all the sand cores and the liner 174. The cylinder head 110 may directly contact the protective layer 194, and one or more of the sealing layer flanges 188a, 188b. In another example, the liner does not include the protective layer, and the cylinder head directly contacts the outer surface of the thermal barrier layer.

At block 218, after the metal has cooled, the head 110 is removed from the pattern 199, and the sand cores 197 are dissolved, with the liner 174 will be trapped within the metal of the head 110. From this step, other post-casting, machining, and assembly operations inherent to creating a cylinder head assembly 108 can be performed.

Referring to FIG. 10, another method 300 is similar to method 200 of FIG. 9 and includes the same steps identified by the same numbers increase by 100. However, while the method 200 of FIG. 9 includes block 208 where injection molding is used to form the thermal barrier layer 190 and the protective layer 194 is applied to the thermal barrier layer 190, the method 300 includes block 308 where a mixture of a binder and a plurality of microspheres are sprayed onto the second surface 182 of the liner 174 to form the thermal barrier layer 190 on the second surface 182, and the liner 174 and the microspheres 192 are sintered.

Referring to FIG. 11, yet another method 400 is similar to method 200 of FIG. 9 and includes the same steps identified by the same numbers increase by 200. However, while the method 200 of FIG. 9 includes block 208 where injection molding is used to form the thermal barrier layer 190, the method 400 includes block 408 where the sealing layer 176 is positioned within the liner mold and the thermal barrier layer is formed around the sealing layer by injecting a foam layer around the sealing layer. The foam layer is a mixture of a liquid ceramic and a foaming agent.

Referring to FIG. 12, still another method 500 is similar to method 200 of FIG. 9 and includes the same steps identified by the same numbers increase by 300. However, while the method 200 of FIG. 9 includes block 208 where injection molding is used to form the thermal barrier layer 190, the method 500 includes block 508 where the thermal barrier layer is formed around the sealing layer by impregnating an open-cell polymer foam with a ceramic slurry, depositing the impregnated foam on the sealing layer, and firing the impregnated foam in a kiln or oven.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An insulated exhaust port liner of a cylinder head assembly for fluidly connecting to an internal combustion engine of a motor vehicle, the insulated exhaust port liner comprising:
    a sealing layer having a first surface defining a passage for fluidly connecting to the internal combustion engine and receiving exhaust gas, and the sealing layer further having a second surface opposite to the first surface; and
    a thermal barrier layer coated onto the second surface of the sealing layer, with the thermal barrier layer comprising a porous non-woven material for supporting the sealing layer on the cylinder head and reducing a transfer of heat from the sealing layer to the cylinder head, and
    wherein the thermal barrier layer has an inwardly facing surface and an outwardly facing surface, wherein a wall thickness is defined by the inwardly facing surface and the outwardly facing surface, and wherein the inwardly facing surface is attached to the second surface of the sealing layer, and wherein the sealing layer includes at least one flange dividing the thermal barrier layer into separate portions by extending through the wall thickness of the thermal barrier layer.

2. The insulated exhaust port liner of claim 1 wherein the thermal barrier layer comprises a binder and a plurality of hollow microspheres mixed with the binder, with the hollow microspheres being comprised of one of a metal and a ceramic.

3. The insulated exhaust port liner of claim 2 wherein the thermal barrier layer further comprises a protective layer coupled to a side of the thermal barrier layer opposite to the sealing layer.

4. The insulated exhaust port liner of claim 1 wherein the thermal barrier layer comprises a foam layer formed by mixing a liquid ceramic and a foaming agent.

5. The insulated exhaust port liner of claim 1 wherein the thermal barrier layer comprises a ceramic foam formed by impregnating an open-cell polymer foam with a ceramic slurry and firing the impregnated foam in one of a kiln or oven.

6. A cylinder head assembly for an internal combustion engine of a motor vehicle, the cylinder head assembly comprising:
 an insulated exhaust port liner comprising:
  a sealing layer having a first surface defining a passage for fluidly connecting to the internal combustion engine for receiving exhaust gas, and the sealing layer further having a second surface opposite to the first surface; and
  a thermal barrier layer formed on the second surface of the sealing layer, with the thermal barrier layer comprising a porous non-woven material; and,
  wherein the thermal barrier layer has an inwardly facing surface and an outwardly facing surface, wherein a wall thickness is defined by the inwardly facing surface and the outwardly facing surface, and wherein the inwardly facing surface is attached to the second surface of the sealing layer, and wherein the sealing layer includes at least one flange dividing the thermal barrier layer into separate portions by extending through the wall thickness of the thermal barrier layer; and
 a cylinder head cast around the insulated exhaust port liner.

7. The cylinder head assembly of claim 6 wherein the thermal barrier layer comprises a binder and a plurality of hollow microspheres mixed with the binder, with the hollow microspheres being comprised of one of a metal and a ceramic.

8. The cylinder head assembly of claim 7 wherein the thermal barrier layer further comprises a protective layer coupled to a side of the thermal barrier layer opposite to the sealing layer.

9. The cylinder head assembly of claim 6 wherein the thermal barrier layer comprises a foam layer formed by mixing a liquid ceramic and a foaming agent.

10. The cylinder head assembly of claim 6 wherein the thermal barrier layer comprises a ceramic foam formed by impregnating an open-cell polymer foam with a ceramic slurry and firing the impregnated foam in one of a kiln or oven.

11. The cylinder head assembly of claim 6 wherein the at least one flange directly engages the cylinder head for positioning the insulated exhaust port liner in the cylinder head.

12. A method of manufacturing a cylinder head assembly having a cylinder head and an exhaust port liner for an internal combustion engine of a motor vehicle, the method comprising:
 forming an insulated exhaust port liner by:
  forming a sealing layer having a first surface to define a passage for fluidly connecting to the internal combustion engine and receiving exhaust gas and a second surface opposite to the first surface;
  forming a thermal barrier layer coated onto the second surface of the sealing layer, with the thermal barrier layer being comprised of a porous non-woven material, and wherein the thermal barrier layer has an inwardly facing surface and an outwardly facing surface, wherein a wall thickness is defined by the inwardly facing surface and the outwardly facing surface, and wherein the inwardly facing surface is attached to the second surface of the sealing layer; and
  forming at least one flange in the sealing layer, wherein the at least one flange extends through the wall thickness of the thermal barrier layer thereby dividing the thermal barrier layer into separate portions; and
 casting the cylinder head around the insulated exhaust port liner.

13. The method of claim 12 further comprising:
 stamping, using a press machine, a pair of components;
 attaching the pair of components to one another to form the liner having a first surface defining a passage, a second surface opposite to the first surface, and
 positioning, using the at least one flange, the sealing layer in a mold.

14. The method of claim 13 further comprising attaching, using at least one of a bonding material and a crimping device, the pair of components to one another.

15. The method of claim 13 further comprising:
 filling a portion of a mold cavity surrounding the sealing layer with a slurry to form the thermal barrier layer on the second surface of the sealing layer, with the slurry comprising one of a ceramic slurry and a plurality of microspheres; and
 firing the mold.

16. The method of claim 13 further comprising:
 spraying a mixture of a binder and a plurality of microspheres onto the second surface of the sealing layer to form a thermal barrier layer on the second surface;
 sintering the sealing layer and the microspheres;
 forming a protective layer onto the thermal barrier layer; and
 firing the protective layer.

17. The method of claim 13 further comprising:
 placing, a sand core insert into the liner; and
 casting the cylinder head around the liner, with the cylinder head directly contacting the at least one flange.

18. The method of claim 13 further comprising insert molding the thermal barrier layer around the sealing layer by injecting a foam layer around the sealing layer with the foam layer comprising a mixture of a liquid ceramic and a foaming agent.

19. The method of claim 13 further comprising insert molding the thermal barrier layer around the sealing layer by impregnating an open-cell polymer foam with a ceramic slurry and firing the impregnated foam in one of a kiln or oven.

* * * * *